United States Patent
Perrillat-Bottonet et al.

(10) Patent No.: US 12,379,254 B2
(45) Date of Patent: Aug. 5, 2025

(54) BROADBAND THERMAL DETECTOR WITH A PLURALITY OF QUARTER-WAVE CAVITIES

(71) Applicant: COMMISSARIAT A L'ENERGIE ATOMIQUE ET AUX ENERGIES ALTERNATIVES, Paris (FR)

(72) Inventors: Thomas Perrillat-Bottonet, Grenoble (FR); Jean-Jacques Yon, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/943,543

(22) Filed: Nov. 11, 2024

(65) Prior Publication Data

US 2025/0155292 A1     May 15, 2025

(30) Foreign Application Priority Data

Nov. 13, 2023   (FR) ....................... 2312370

(51) Int. Cl.
*G01J 5/08*     (2022.01)
*G01J 5/02*     (2022.01)

(52) U.S. Cl.
CPC ........... *G01J 5/0853* (2013.01); *G01J 5/0225* (2013.01)

(58) Field of Classification Search
CPC .............................. G01J 5/0853; G01J 5/0225
See application file for complete search history.

(56) References Cited

U.S. PATENT DOCUMENTS

2010/0148067 A1*   6/2010  Cheon ....................... G01J 5/02
                                                              216/13

FOREIGN PATENT DOCUMENTS

| JP | 2009-25306 A | 2/2009 |
|---|---|---|
| WO | WO 2020/084242 A1 | 4/2020 |

OTHER PUBLICATIONS

Preliminary Search Report & Written Opinion mailed Apr. 29, 2024, in corresponding French Patent Application No. 2312370 with English translation, 16 pages.

(Continued)

*Primary Examiner* — David P Porta
*Assistant Examiner* — Meenakshi S Sahu
(74) *Attorney, Agent, or Firm* — Oblon, McClelland, Maier & Neustadt, L.L.P.

(57) ABSTRACT

A thermal detector with a suspended absorbent membrane, which has at least two absorbers. The second absorber is designed to absorb the electromagnetic radiation in a spectral sub-band of a predefined spectral band, centered on a wavelength $\lambda_{c2}$. Moreover, it is spaced from a reflector by a value equal to $\lambda_{c2}/4n_{eq2}$ so as to form therewith a quarter-wave cavity for the wavelength $\lambda_{c2}$, the spectral sub-band being centered on the wavelength $\lambda_{c2}$ which is equal to $\lambda_{c1}/2$ within plus or minus 2 μm. Furthermore, the first and second absorbers have total surface areas such that a surface area ratio is between 0.5 and 3.

10 Claims, 7 Drawing Sheets

(56) References Cited

OTHER PUBLICATIONS

Sang-Wook Han et al.: "Multilayer Fabry-Perot Microbolometers for Infrared Detection", Infrared and Millimeter Waves and 13th International Conference on Ter Ahertz Electronics, 2005. IRMMW-THZ 2005. The Joint 30th International Conference on Williamsburg, VA, USA Sep. 19-23, 2005, Piscataway, NJ, USA, IEEE, vol. 2, Sep. 19, 2005, pp. 646-647.
Varpula Aapo et al.: "High-performance infrared thermoelectric bolometers based on nanomembranes", SPIE Proceedings; [Proceedings of SPIE ISSN 0277-786X], SPIE, US, vol. 11289, Feb. 26, 2020, 18 pages.
Office Action issued Mar. 25, 2025, in corresponding Japanese Patent Application No. 2024-197454, 7 pages.

\* cited by examiner

BROADBAND THERMAL DETECTOR WITH A PLURALITY OF QUARTER-WAVE CAVITIES

TECHNICAL FIELD

The field of the invention is that of devices for detecting electromagnetic radiation, for example infrared or terahertz, having at least one thermal detector with an absorbent membrane suspended above the readout substrate. The invention is applicable in particular to the fields of infrared imaging, thermography and, inter alia, gas detection.

PRIOR ART

Devices for detecting electromagnetic radiation can comprise a matrix of thermal detectors each having a membrane designed to absorb the electromagnetic radiation to be detected and containing a thermometer transducer such as a thermistor material. In order to ensure the thermal insulation of the thermometer transducers from the readout substrate, the absorbent membranes are usually suspended above the readout substrate by anchor posts, and are thermally insulated therefrom by holding arms. These anchor posts and holding arms also have an electrical function by connecting the absorbent membranes to the readout circuit generally arranged in the substrate. The absorbent membrane has an absorber, for example a thin metal film, designed to absorb the electromagnetic radiation to be detected, which is thermally coupled to the thermometer transducer.

Figure 1:
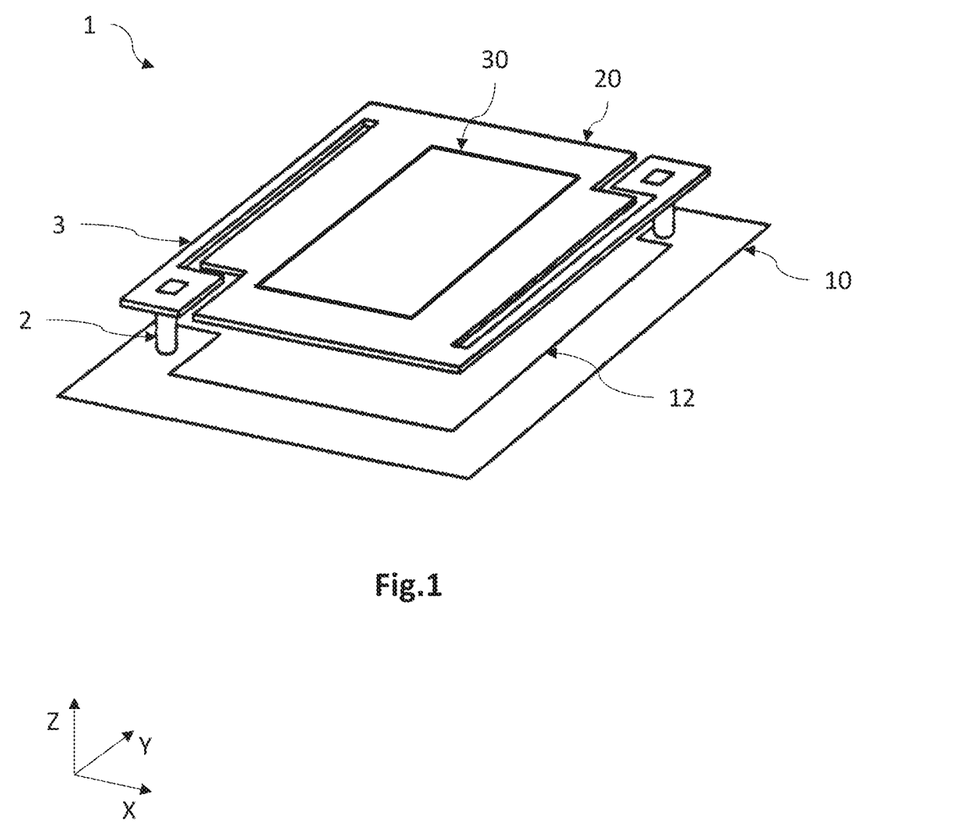
FIG. 1, which has already been described, is a schematic, perspective partial view of a thermal detector according to one example in the prior art.

FIG. 1 is a perspective view of an exemplary thermal detector 1 according to an example in the prior art, in this case designed to absorb infrared radiation in the Long-Wave Infrared (LWIR) spectral band, the central wavelength of which is comprised between around 8 μm and 12 μm.

The thermal detector 1 has an absorbent membrane 20 suspended above a readout substrate 10 by anchor posts 2 and thermally insulated therefrom by holding and thermal insulation arms 3. These anchor posts 2 and thermal insulation arms 3 also have an electrical function by electrically connecting the absorbent membrane 20 to a readout circuit located in the readout substrate 10.

The membrane 20 has an absorber 30 here designed to absorb the electromagnetic radiation to be detected and a thermometer transducer in thermal contact with the absorber. The thermometer transducer can be a material having an electrical resistance which varies as it heats up (thermistor). It can in particular be amorphous silicon or vanadium oxide. The absorbent membrane 20 is vertically spaced from a reflector 12 by a distance determined so as to form a quarter-wave interference cavity optimising the absorption by the absorbent membrane 20 of the electromagnetic radiation to be detected. Such an absorber is therefore generally called a Salisbury absorber.

Document WO2020/084242A1 describes two structural configurations of the absorbent membrane, which contains a Salisbury absorber similar to the one in FIG. 1, i.e. a thin-film absorber located at a distance h equal to $\lambda_c/4n_{eq}$, where $\lambda_c$ is the central wavelength of the total spectral band of detection $\Delta\lambda_{tot}$ (in this case 8-14 μm) and where $n_{eq}$ is an equivalent refractive index of the medium associated with the quarter-wave cavity. The absorber generally has a surface resistance close to the impedance of free space $Z_0=377\Omega$.

In a first configuration, the polarisation electrodes act as absorbers of light radiation in the spectral band of detection $\Delta\lambda_{tot}$. They are therefore spaced vertically from the reflector by a distance such that, given the materials present in the quarter-wave cavity, the absorption is optimal for the central wavelength $\lambda_{c1}$ (in this case around 11 μm) of the spectral band of detection $\Delta\lambda_{tot}$ (8-14 μm).

In a second configuration, the polarisation electrodes do not act as absorbers. In addition, a thin film absorber is located on the thermometer transducer, perpendicular to the lateral spacing between the two polarisation electrodes. In this way, the absorber does not vertically cover the latter. It is therefore spaced vertically from the reflector by a distance such that, given the materials present in the quarter-wave cavity, the absorption is optimal for the central wavelength $\lambda_{c1}$ of the spectral band of detection $\Delta\lambda_{tot}$.

However, there is a need to broaden the spectral band of detection $\Delta\lambda$tot, particularly at shorter wavelengths, while maintaining a uniformly high absorption rate (e.g. at least 70% across the entire spectral band of detection). However, it is known that the absorption spectrum of such an absorber is limited by the presence of an antiresonance at a wavelength $\lambda_c/2n_{eq}$, thus limiting absorption to low wavelengths and not allowing the spectral band of detection $\Delta\lambda_{tot}$ to be broadened.

It should be noted that document US2010/0148067A1 describes another configuration of an absorbent membrane, where a first absorber is formed by the polarisation electrodes and is located above the thermometer transducer. It is shaped like an interdigitated comb and is spaced from the reflector to form a quarter-wave cavity optimising absorption in a spectral band $\Delta\lambda_{tot}$ centred on the wavelength of 10 μm.

The absorbent membrane has a second absorber, located below the absorber, and designed to absorb the light radiation in the same spectral band $\Delta\lambda_{tot}$ which would not have been absorbed by the upper absorber. The objective here is to improve the absorbance of the membrane. However, the spectral band of detection is not broadened.

DISCLOSURE OF THE INVENTION

An object of the invention is to at least partially overcome the drawbacks of the prior art, and more specifically to propose a thermal detector having a broadband absorption spectrum whilst maintaining uniformly high absorption across the entire spectral band of detection.

To achieve this, the object of the invention is a thermal detector of electromagnetic radiation in a predefined spectral band $\Delta\lambda_{tot}$, having:
- a readout substrate, having: a readout circuit; a reflector designed to reflect the electromagnetic radiation;
- an absorbent membrane suspended above the readout substrate, thermally insulated from the readout substrate, having a thermometer transducer electrically connected to the readout circuit, and having:
  - a first thin-film absorber, with a total surface area $S_1$, thermally coupled to the thermometer transducer, and designed to absorb the electromagnetic radiation in a spectral sub-band $\Delta\lambda_1$ of the spectral band $\Delta\lambda_{tot}$, centred on a wavelength $\lambda_{c1}$, and is spaced from the reflector by a value $h_1$ equal to $\lambda_{c1}/4n_{eq1}$ so as to form therewith a first quarter-wave cavity $C_1$ for the wavelength $\lambda_{c1}$, $n_{eq1}$ being a refractive index of the medium associated with the first quarter-wave cavity $C_1$;
  - at least one second thin-film absorber, with a total surface area $S_2$, thermally coupled to the thermometer transducer, arranged in the absorbent membrane so as not to be covered by the first absorber.

According to the invention, the second absorber is designed to absorb the electromagnetic radiation in a spectral sub-band $\Delta\lambda_2$ of the spectral band $\Delta\lambda_{tot}$, centred on a wavelength $\lambda_{c2}$, and is spaced from the reflector by a value $h_2$ equal to $\lambda_{c2}/4n_{eq2}$ so as to form therewith a second quarter-wave cavity $C_2$ for the wavelength $\lambda_{c2}$, $n_{eq2}$ being a refractive index of the medium associated with the second quarter-wave cavity $C_2$, the spectral sub-band $\Delta\lambda_2$ being centred on the wavelength $\lambda_{c2}$ equal to $\lambda_{c1}/2$ within plus or minus 2 μm.

Moreover, the first and second absorbers have total surface areas such that a surface area ratio $S_2/S_1$ is comprised between 0.5 and 3.

Certain preferred but non-limiting aspects of this thermal detector are as follows.

The first absorber can rest on the thermometer transducer.

The second absorber can extend into the absorbent membrane without being covered by the thermometer transducer.

The second absorber can be formed by parts of a metallic layer, forming, on the one hand, polarisation tracks at holding arms ensuring the support and thermal insulation of the absorbent membrane, and on the other hand, polarisation electrodes coming into contact with the thermometer transducer.

The metallic layer can extend in a planar manner into the holding arms and into the absorbent membrane.

The thermal detector can have a third absorber designed to absorb the electromagnetic radiation in a spectral sub-band $\Delta\lambda_3$ of the spectral band $\Delta\lambda_{tot}$, centred on a wavelength $\lambda_{c3}$, and spaced from the reflector by a value $h_3$ equal to $\lambda_{c3}/4n_{eq3}$ so as to form therewith a quarter-wave cavity $C_3$ for a wavelength $\lambda_{c3}$, $n_{eq3}$ being a refractive index of the medium associated with the quarter-wave cavity $C_3$, the wavelength $\lambda_{c3}$ being between the wavelengths $\lambda_{c1}$ and $\lambda_{c2}$.

The distance $h_3$ can be equal to the distance $h_2$, the third absorber being covered by the thermometer transducer.

The thermal detector can have at least one absorber designed to absorb the electromagnetic radiation in a spectral sub-band $\Delta\lambda_4$ of the spectral band $\Delta\lambda_{tot}$, centred on a wavelength $\lambda_{c4}$, and spaced from the reflector by a value $h_4$ equal to $\lambda_{c4}/4n_{eq4}$ so as to form therewith a quarter-wave cavity $C_4$ for a wavelength $\lambda_{c4}$, $n_{eq4}$ being a refractive index of the medium associated with the quarter-wave cavity C4. The absorber of the quarter-wave cavity $C_4$ can be in a flat part of the absorbent membrane forming a step with respect to a main plane in which a metallic layer extends forming polarisation tracks located in the holding arms and polarisation electrodes in contact with the thermometer transducer.

The spectral band of detection $\Delta\lambda_{tot}$ can comprise the spectral band LWIR ranging from 8 to 12 μm.

The thermal detection can have absorption at least equal to 80% across the entire spectral band of detection $\Delta\lambda_{tot}$.

BRIEF DESCRIPTION OF THE DRAWINGS

Other aspects, aims, advantages and features of the invention will become more apparent upon reading the following detailed description of preferred embodiments thereof, given as a non-limiting example, and made with reference to the appended drawings, wherein.

DETAILED DISCLOSURE OF PARTICULAR EMBODIMENTS

In the figures and in the remainder of the description, the same references represent identical or similar elements. In addition, the various elements are not shown to scale so as to ensure that the figures are as clear as possible. Moreover, the different embodiments and variants are not mutually exclusive and can be combined together. Unless indicated otherwise, the terms "substantially", "about", "of the order of" mean within a 10% margin, and preferably within a 5% margin. Moreover, the terms "comprised between . . . and . . ." and the like mean that the boundaries are included, unless stated otherwise.

The invention relates to a thermal detector of electromagnetic radiation, for example infrared or terahertz, in a broad spectral band of detection $\Delta\lambda_{tot}$, with uniformly high absorption across the entire spectral band $\Delta\lambda_{tot}$, i.e. the absorption spectrum $\alpha_{tot}(\lambda)$ has a value at least equal to a predefined threshold value across the entire spectral band $\Delta\lambda_{tot}$. By way of example, the spectral band of detection $\Delta\lambda_{tot}$ covers at least the LWIR range (8-12 μm) and extends in particular to shorter wavelengths.

The thermal detector can be part of a matrix of detectors in a detection device, where the thermal detectors are identical and arranged periodically. They each have an absorbent membrane suspended above the same readout substrate.

The absorbent membrane has at least two Salisbury absorbers thermally coupled to the same thermometer transducer (so the heat from the absorbers is transmitted to the transducer), defining at least two quarter-wave cavities with the same reflector of the readout substrate. At least one of the quarter-wave cavities has a resonance wavelength equal to the antiresonance wavelength of another quarter-wave cavity plus or minus 2 µm.

In other words, as set out in detail below, the absorbent membrane is designed so that the first quarter-wave cavity $C_1$ optimises the absorption of the first absorber at a resonance wavelength $\lambda_{c1}$ (central wavelength of the absorption spectral band $\Delta\lambda_1$ of the first absorber). Therefore, the first absorber is spaced from the reflector at a vertical distance $h_1$ equal to $\lambda_{c1}/4n_{eq1}$, where $n_{eq1}$ is the equivalent refractive index of the medium associated with the quarter-wave cavity $C_1$, i.e. the medium located perpendicular to the first absorber and the reflector, as well as the medium of the absorbent membrane located on and perpendicular to the first absorber.

Moreover, the absorbent membrane is designed so that a second quarter-wave cavity $C_2$ optimises the absorption of a second absorber at a resonance wavelength $\lambda_{c2}$ (central wavelength of the absorption band $\Delta\lambda_2$ of the second absorber). Therefore, the second absorber is spaced from the reflector at a vertical distance $h_2$ equal to $\lambda_{c2}/4n_{eq2}$, where $n_{eq2}$ is the equivalent refractive index of the medium associated with the quarter-wave cavity $C_2$. The distance $h_2$ and/or the refractive index $n_{eq2}$ are chosen such that the resonance wavelength $\lambda_{c2}$ is equal to the antiresonance of the quarter-length cavity $C_1$, i.e. $\lambda_{c1}/2$, to within plus or minus 2 µm: $\lambda c2 = \lambda c1/2 \pm 2$ µm, or $\lambda c1/2 - 2$ µm $\leq \lambda_{c2} \leq \lambda c1/2 + 2$ µm. In this way, the spectral band of detection $\Delta\lambda_{tot}$ of the thermal detector is therefore broadened insofar as it extends over at least the two absorption spectral bands $\Delta\lambda_1$ and $\Delta\lambda_2$.

Moreover, so that the absorption spectrum $\alpha_{tot}(\lambda)$ of the thermal detector has a uniformly high value across the entire spectral band of detection $\Delta\lambda_{tot}$, the surface area ratio $S_i/S_j$ between the absorbers is comprised between 0.5 and 3, where the surface area $S_i$ corresponds to the total surface area of the absorber of rank i, the resonance wavelength of which is substantially equal (±2 µm) to the antiresonance wavelength of the absorber of rank j. Thus, the contribution of each absorber, in terms of spectral response, to the total absorption spectrum $\alpha_{tot}(\lambda)$ is balanced, which ensures that the total absorption is uniformly high across the entire spectral band of detection $\Delta\lambda_{tot}$. The surface area S of an absorber is defined as being the total surface area thereof, i.e. located at a constant distance h from the reflector, in the quarter-wave cavity in question.

Figure 2A:
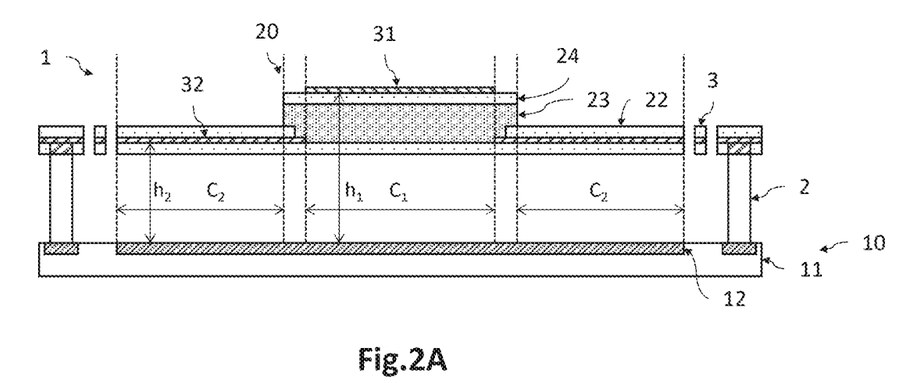
FIG. 2A is a partial schematic view, in cross-section, of a thermal detector according to one embodiment.
Figure 2B:
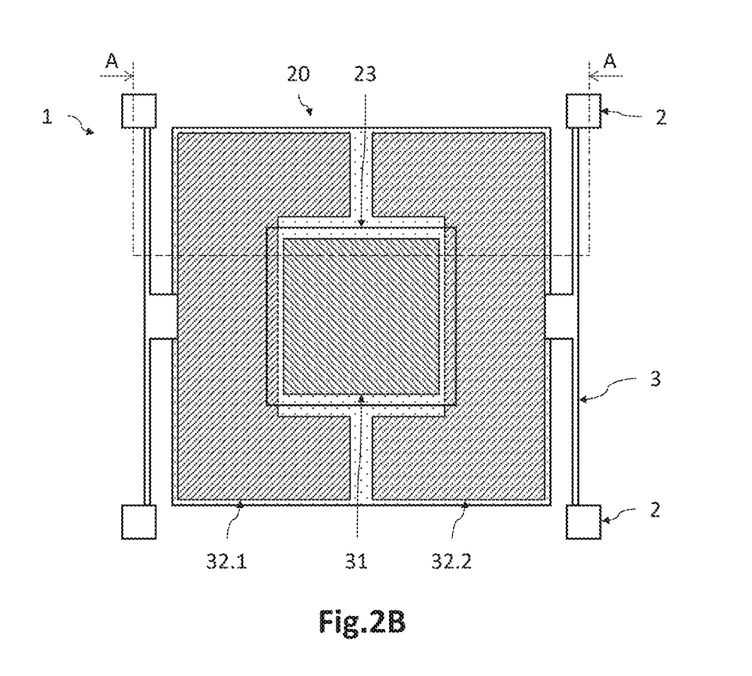
FIG. 2B is a top view of the thermal detector shown in FIG. 2A.

FIG. 2A is a partial schematic view of a thermal detector 1 of electromagnetic radiation, in this case infrared radiation, according to one embodiment, in cross-section along a section line AA (cf. FIG. 2B). FIG. 2B is a partial schematic top view of the thermal detector 1 shown in FIG. 2A.

A three-dimensional direct reference frame XYZ is defined here and for the remainder of the description, where the plane XY is substantially parallel to the plane of a readout substrate 10 of the thermal detector 1, the axis Z being oriented in a direction substantially orthogonal to the plane XY of the readout substrate 10 in the direction of the absorbent membrane 20. Moreover, the terms "lower" and "upper" are understood as relating to an increasing positioning when moving away from the reading substrate 10 in the +Z direction.

The readout substrate 10 consists of a support substrate 11 containing the readout circuit (not shown) designed to control and read the thermal detector 1. The readout circuit can be in the form of a CMOS integrated circuit. It therefore has conductive portions that are flush with the top surface of the readout substrate 10, which is substantially flat. The conductive portions and conductive vias can be made of copper, aluminium and/or tungsten, inter alia, for example by means of a damascene process in which trenches etched in the inter-metal insulating layer are filled.

The thermal detector 1 has a reflector 12, which rests on or in the readout substrate 10. It is designed to reflect the electromagnetic radiation to be detected in the direction of the absorbent membrane 20, and is preferably made from at least one metallic material. It can be covered by this protective layer, made of a material substantially inert to an etchant subsequently used to remove the sacrificial layer(s) which are used to produce the suspended membrane 20 as well as an encapsulation structure (which defines a vacuum cavity in which the absorbent membrane 20 is located). The reflector 12 extends in the plane XY under the absorbent membrane 20, in particular under the absorbers located therein.

The thermal detector 1 has an absorbent membrane 20 suspended above the readout substrate 10 by anchor posts 2 and thermally insulated therefrom by holding and thermal insulation arms 3. The anchor posts 2 and holding arms 3 also provide an electrical connection to the readout circuit contained in the readout substrate 10. The holding arms 3 can be formed by a stack of a lower insulating layer 21 (for example $Al_2O_3$ or amorphous silicon), a polarisation conductor track 22 (for example TiN or NiCr), and an upper insulating layer 23 (for example $Al_2O_3$ or amorphous silicon).

The absorbent membrane 20 has a thermometer transducer 23, in this case formed by a thermistor layer, i.e. a layer made of a material whose electrical resistance varies depending on its thermal heating, polarisation electrodes, and at least two absorbers 31, 32 thermally coupled to the same thermometer transducer 23.

In this example, the absorbent membrane 20 has a lower insulating layer 21, for example made of a dielectric material such as aluminium oxide, an oxide and/or silicon nitride, or of an unintentionally doped semiconductor material such as amorphous silicon. It can have a thickness, for example, comprised between 5 nm and 100 nm, preferably comprised between 15 nm and 50 nm.

Polarisation electrodes rest on the lower insulating layer 21. They are made from an electrically conductive material, in this case a metallic material such as TiN or NiCr, inter alia, with a thickness, for example, comprised between 5 and 15 nm, preferably between 6 and 10 nm. As explained below, these polarisation electrodes form a so-called lower thin-film absorber 32 here. However, alternatively, the lower absorber can be separate from the polarisation electrodes. The material and thickness of the lower absorber 32 are preferably chosen such that its surface resistance is substantially equal to the impedance of free space.

The lower absorber 32 is therefore formed by two spatially distinct parts 32.1 and 32.2, which extend from the holding arms 3 to the edge of the thermometer transducer 23, in order to be able to electrically polarise it. In this example, each part of the lower absorber 32 extends in a C-shape so as to extend over a large part of the absorbent membrane 20. On the other hand, at the thermometer transducer 23, the two parts 31.1 and 31.2 are sufficiently spaced laterally in the XY plane so as not to be perpendicular to the upper absorber 32. The surface area $S_2$ of the lower absorber 32 corresponds to the sum of the surface areas of the two separate parts 32.1, 32.2. Each part of the lower absorber 32 extends in this case continuously and with a constant thickness. Alternatively, it can extend discontinuously and have a non-constant thickness.

The lower absorber 32 is located at a substantially constant distance $h_2$ from the reflector 12, thus forming a quarter-wave cavity $C_2$ of the resonance wavelength $\lambda_{c2}$, where $h_2=\lambda_{c2}/4n_{eq2}$. The wavelength $\lambda_{c2}$ is a central wavelength of the spectral sub-band $\Delta\lambda_2$ of the spectral band $\Delta\lambda_{tot}$. Here, $n_{eq2}$ is the equivalent refractive index of the medium associated with the quarter-wave cavity $C_2$, i.e. the medium located vertically above the lower absorber 32, between the latter and the reflector 12, as well as the medium located on and vertically above the lower absorber 32. As detailed below, the distance $h_2$ and/or the refractive index $n_{eq2}$ are chosen such that the wavelength $\lambda_{c2}$ is equal, to within plus or minus 2 μm, to the antiresonance wavelength $\lambda_{c1}/2$ of the quarter-wave cavity C1.

The thermometer transducer 23 extends in this case over and in contact with the polarisation electrodes and the lower insulating layer 21. It is a thermistor material with a thickness, for example, of the order to a few dozen to hundreds of nanometres. It can be a material containing vanadium or titanium oxide or amorphous silicon. Alternatively, it can also be a diode (p-n or pin junction) or a metal-oxide-semiconductor field-effect transistor (MOSFET), inter alia.

An upper protective layer 24 covers the thermometer transducer 23, in this case only on the upper surface of the latter, but it can cover it entirely to protect the thermometer transducer 23 from possible contamination or damage during steps of the manufacturing method. It can be made of an electrically insulating material, for example a dielectric material such as a silicon oxide, nitride or oxynitride, or even aluminium oxide, inter alia, with a thickness of a few dozen nanometres.

The absorbent membrane 20 has a second absorber 31, the so-called upper absorber, formed by a thin film made of at least one material designed to absorb the electromagnetic radiation to be detected, for example of a metallic material such as TiN or NiCr, inter alia, with a thickness, for example, comprised between 5 and 15 nm, preferably between 6 and 10 nm. The upper absorber 31 is thermally coupled to the thermometer transducer 23. It rests here on the upper protective layer 24, and does not extend opposite (vertically) to the lower absorber 32, so as to prevent impairing the absorption of the electromagnetic radiation by one or other of the absorbers.

The material and thickness of the upper absorber 31 are preferably chosen such that its surface resistance is substantially equal to the impedance of free space. It extends in this case continuously and with a constant thickness. Alternatively, it can extend discontinuously and have a non-constant thickness. $S_1$ is the total surface area of the upper absorber 31.

The upper absorber 31 is located at a substantially constant distance $h_1$ from the reflector 12, thus forming a quarter-wave cavity $C_1$ of the resonance wavelength $\lambda_{c1}$, where $h_1=\lambda_{c1}/4n_{eq1}$. The wavelength $\lambda_{c1}$ is a central wavelength of the spectral sub-band $\Delta\lambda_1$ of the spectral band $\Delta\lambda_{tot}$. Here, $n_{eq1}$ is the equivalent refractive index of the medium associated with the quarter-wave cavity $C_1$, i.e. the medium located vertically above the upper absorber 31, between the latter and the reflector 12, as well as the medium located on and vertically above the upper absorber 31.

According to the invention, the absorbent membrane 20 therefore has at least two Salisbury absorbers 31, 32 designed to absorb the electromagnetic radiation in the spectral band of detection $\Delta\lambda_{tot}$. It is designed such that the resonance wavelength $\lambda_{c2}$ associated with the quarter-wave cavity $C_2$ is equal, to within plus or minus 2 μm, to the antiresonance wavelength $\lambda_{c1}/2$ associated with the quarter-wave cavity $C_1$. This configuration can be obtained by adjusting the one and/or the other of the distances $h_1$ and $h_2$, or by adjusting the one and/or other of the equivalent refractive indices $n_{eq1}$ and $n_{eq2}$ (by the choice of materials and thicknesses).

Thus, the total absorption spectrum $\alpha_{tot}(\lambda)$ of the thermal detector 1 corresponds to the sum of the absorption spectrum $\alpha_1(\lambda)$ of the upper absorber 31 and the absorption spectrum $\alpha_2(\lambda)$ of the lower absorber 32. The spectral band of detection $\Delta\lambda_{tot}$ is no longer limited by the antiresonance of the quarter-wave cavity $C_1$, and it appears that it is not limited either by the antiresonance of the quarter-wave cavity $C_2$ (as detailed below with reference to FIG. 3B).

Moreover, the surface area ratio $S_2/S_1$ is comprised between 0.5 and 3, preferably between 0.8 and 2, and preferably equal to around 1. In this way, the contribution of each absorber 31, 32 to the total absorption spectrum $\alpha_{tot}(\lambda)$ of the thermal detector 1 is balanced, which results in a uniformly high absorption value $\alpha_{tot}$, at least equal to a predefined threshold value $\alpha_{tot,th}$, over the entire spectral band $\Delta\lambda_{tot}$.

It should be noted that the lower absorber 32, which in this case also forms the polarisation electrodes, has a much larger total surface area than in the prior art where the electrodes are narrow tracks and do not form a Salisbury absorber.

Figure 3A:
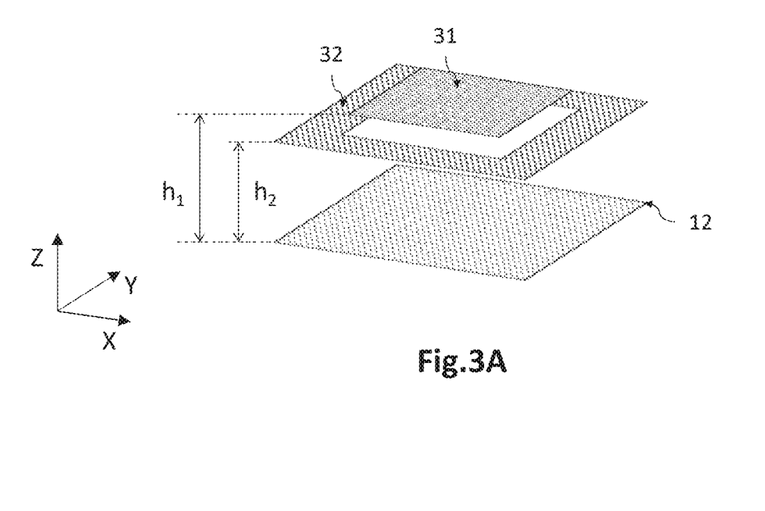
FIG. 3A schematically shows two Salisbury absorbers and a reflector of a thermal detector according to one embodiment.
Figure 3B:
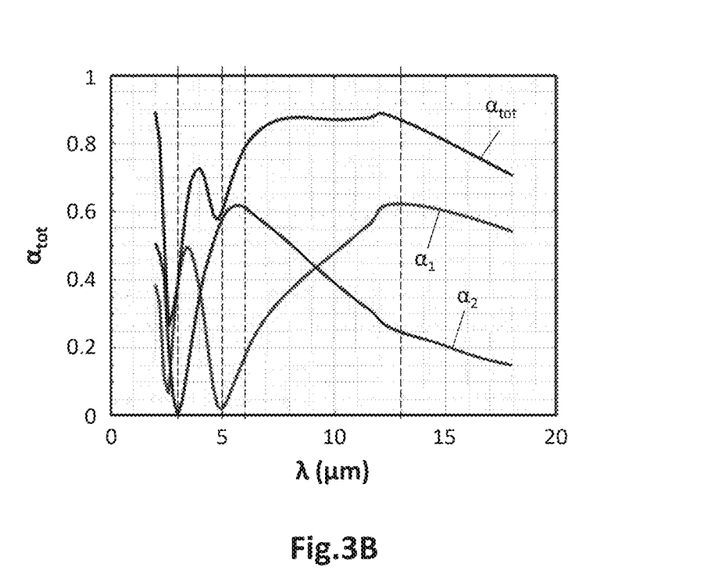
FIG. 3B shows examples of a total absorption spectrum of the thermal detector and absorption spectra of the absorbers shown in FIG. 3A, where a surface area ratio $S_2/S_1$ is equal to 1.
Figure 4A:
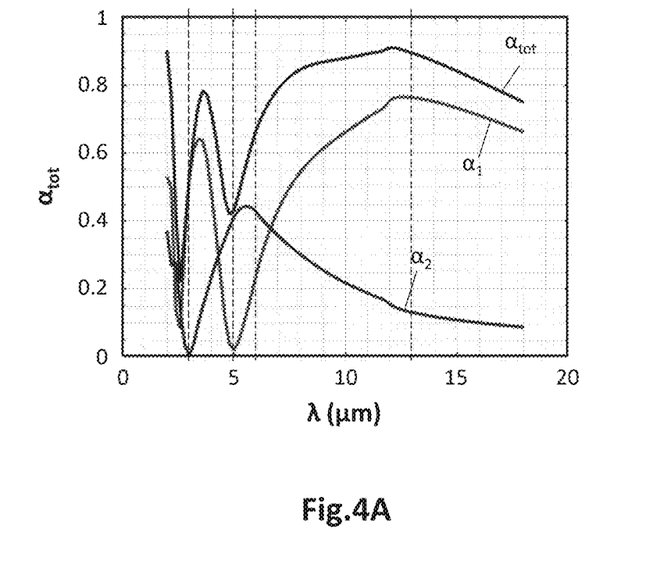
FIG. 4A shows examples of a total absorption spectrum $\alpha_{tot}(\lambda)$ of the thermal detector and absorption spectra $\alpha_1(\lambda)$ and $\alpha a_2(\lambda)$ of the absorbers shown in FIG. 3A, where a surface area ratio $S_2/S_1$ is equal to 0.5.
Figure 4B:
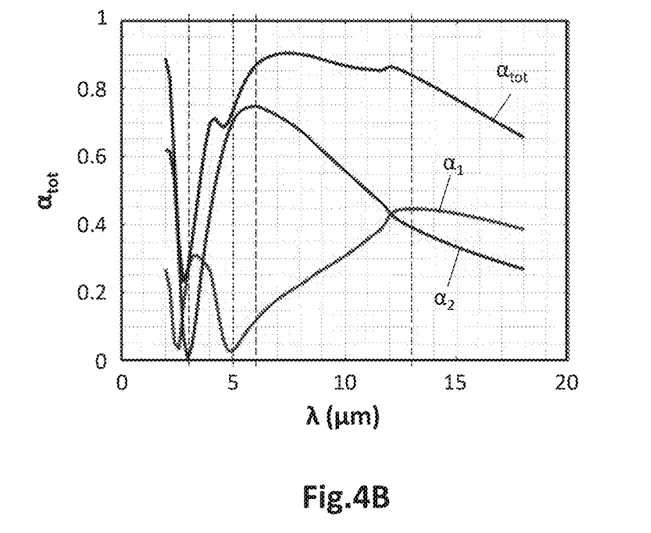
FIG. 4B shows examples of a total absorption spectrum $\alpha_{tot}(\lambda)$ of the thermal detector and absorption spectra $\alpha_1(\lambda)$ and $\alpha_2(\lambda)$ of the absorbers shown in FIG. 3A, where a surface area ratio $S_2/S_1$ is equal to 2.

In order to illustrate the contribution of the absorbers 31, 32 to the total absorption spectrum $\alpha_{tot}(\lambda)$ of the thermal detector 1, two absorbers 31, 32 and a reflector 12 are now considered as shown schematically in FIG. 3A. FIGS. 3B, 4A and 4B show examples of the total absorption spectrum $\alpha_{tot}(\lambda)$ of the absorbent membrane 20 as well as those $\alpha_1(\lambda)$ and $\alpha_2(\lambda)$ of the upper absorber 31 and lower absorber 32, where the surface area ratio $S_2/S_1$ is equal to around 1 (FIG. 3B), equal to around 0.5 (FIG. 4A) and equal to around 2 (FIG. 4B).

In this example, the lower absorber 32 is made of TiN with a thickness of 8 nm, and extends in the plane XY as a square-shaped ring. It is vertically spaced from the reflector 12 by a distance $h_2$ equal to 1.5 μm in this case. Furthermore, the upper absorber 31 is made of TiN with a thickness of 8 nm, and extends in the plane XY in the shape of a square. Its dimensions are equal to those of the empty inner space of the lower absorber 32 in this case. It is vertically spaced from the reflector 12 by a distance $h_1=h_2+\delta$ equal to 2.5 μm in this case. Furthermore, the pixel pitch is equal to 12 μm in this case, and the fill factor ff defined by the relationship ff=$(S_2+S_1)/p^2$ is equal to 80%.

The absorption spectra are obtained here by numerically solving Maxwell's equations using finite elements.

The absorption spectrum $\alpha_1(\lambda)$ of the upper absorber 31 has a maximum value around the resonance wavelength $\lambda_{c1}$ equal here to around 13 μm, as well as a sharp decrease at the antiresonance wavelength of around 5 μm. Furthermore, the absorption spectrum $\alpha_2(\lambda)$ of the lower absorber 32 has a maximum value around the resonance wavelength $\lambda_{c2}$ equal here to around 6 μm, as well as a sharp decrease at the antiresonance wavelength of around 3 μm. Also, it appears that the absorption spectrum $\alpha_{tot}(\lambda)$ no longer has a sharp decrease at the antiresonance wavelengths of 5 μm (absorption of around 60%) and 3 μm (absorption of around 40%).

Moreover, the contribution of each absorber 31, 32 is homogeneous here, due to the surface area ratio $S_2/S_1$ equal to around 1, such that the total absorption spectrum $\alpha_{tot}(\lambda)$ is uniformly high across the entire spectral band of detection $\Delta\lambda_{tot}$. Thus, if the threshold absorption value is assumed to be equal to 40%, the spectral band of detection $\Delta\lambda_{tot}$ ranges from 3 µm to more than 20 µm. If it is assumed to be 60%, it ranges from 5 µm to more than 20 µm. And if it is assumed to be 80%, it ranges from 6 to 15 µm. Thus, the spectral band of detection $\Delta\lambda_{to}$ is considerably broadened, and the total absorption spectrum $\alpha_{tot}(\lambda)$ is uniformly high, i.e. at least equal to the threshold value across the entire spectral band $\Delta\lambda_{tot}$.

It should be noted here that it is advantageous for the maximum lateral dimensions of the absorbers 31, 32 to be less than or equal to the central wavelength of the spectral band of detection $\Delta\lambda_{tot}$. In this example, it is equal to around 11 am for a spectral band $\Delta\lambda_{tot}$ of 6-15 µm (threshold absorption value of 80%). Here, the upper absorber 31 is in the shape of a square with side a of 7.6 µm, and the lower absorber 32 is in the shape of a square ring with a side of 10.7 µm. In addition, the lateral dimensions of the absorbers are less than the central wavelength of 11 µm.

It seems then that this configuration maximises the efficiency of optical collection of the incident electromagnetic radiation. Indeed, the upper absorber 31, while its relative surface area is 40%, absorbs up to 65% around its resonance wavelength of 13 µm. Similarly, the lower absorber 32, while its relative surface area is also 40%, absorbs up to 60% around its resonance wavelength of 5 µm. The association of the two absorbers 31, 32 which cover a total relative surface area of 80% of the surface of the detection pixel makes it possible to absorb more than 80% of the incident radiation between 6 and 15 µm.

It is possible to modify the total absorption spectrum $\alpha_{tot}(\lambda)$ of the thermal detector 1 by adjusting the contribution of each absorption spectrum $\alpha_1(\lambda)$ and $\alpha_2(\lambda)$ via the surface area ratio $S_2/S_1$.

When the surface area ratio $S_2/S_1$ is equal to 0.5 (cf. FIG. 4a), the contribution of the lower absorber 32 is reduced here in favour of that of the upper absorber 31. And when the surface area ratio $S_2/S_1$ is equal to 2 (cf. FIG. 4B), the contribution of the lower absorber 32 is increased at the expense of that of the upper absorber 31.

Thus, when the threshold absorption value is equal to 60%, the absorption spectral band $\Delta\lambda_{tot}$ ranges from 6 am to more than 20 am where $S_2/S_1=0.5$ (FIG. 4A) with a maximum absorption of 90% around 12 µm. On the other hand, it ranges from 4 am to 20 am where $S_2/S_1=2$ (FIG. 4B) with a maximum absorption of 90% around 7-8 µm.

Figure 5A:
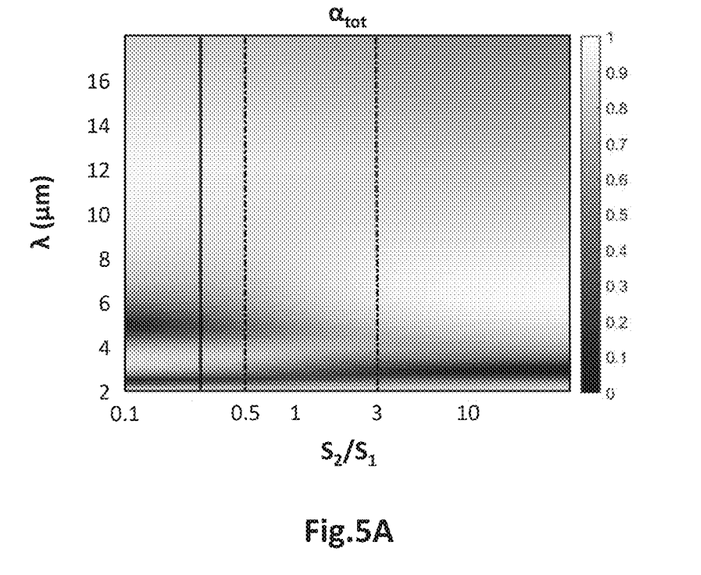
FIG. 5A shows an example of the total absorption spectrum $\alpha_{tot}(\lambda)$ of the thermal detector as a function of the surface area ratio $S_2/S_1$ of the absorbers.
Figure 5B:
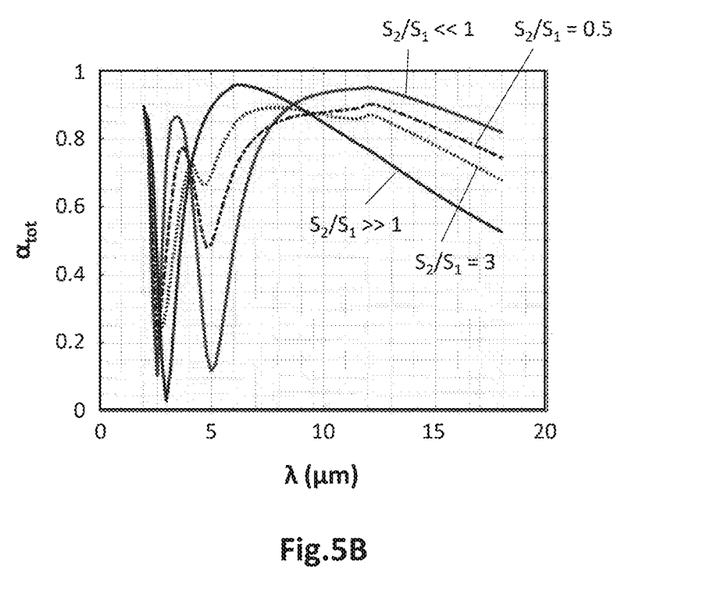
FIG. 5B shows a plurality of total absorption spectra $\alpha_{tot}(\lambda)$ of the thermal detector, for different values of the surface area ratio $S_2/S_1$ of the absorbers, from the example shown in FIG. 5A.

FIG. 5 shows an exemplary total absorption spectrum $\alpha_{tot}(\lambda)$ as a function of the surface area ratio $S_2/S_1$ in the case of the configuration shown in FIG. 3A, and FIG. 5B shows the total absorption spectra $\alpha_{tot}(\lambda)$ where $S_2/S_1=0.5$, where $S_2/S_1=3$, and where $S_2/S_1$ is very small ($S_2/S_1\ll1$: the upper absorber 31 fills the entire available surface area) and where $S_2/S_1$ is very large ($S_2/S_1\gg1$: the lower absorber 32 fills the entire available surface area).

For the total absorption spectrum $\alpha_{tot}(\lambda)$ where $S_2/S_1$ is very small, a spectrum exhibits a peak at the antiresonance wavelength of the quarter-wave cavity $C_1$, i.e. around 5 µm. Similarly, for the total absorption spectrum $\alpha_{tot}(\lambda)$ where $S_2/S_1$ is very large, a spectrum exhibits a peak at the antiresonance wavelength of the quarter-wave cavity $C_2$, i.e. around 3 µm. These absorption limitations are not found in the total absorption spectra $\alpha_{tot}(\lambda)$ where $S_2/S_1=0.5$ and $S_2/S_1=3$.

Figure 6A:
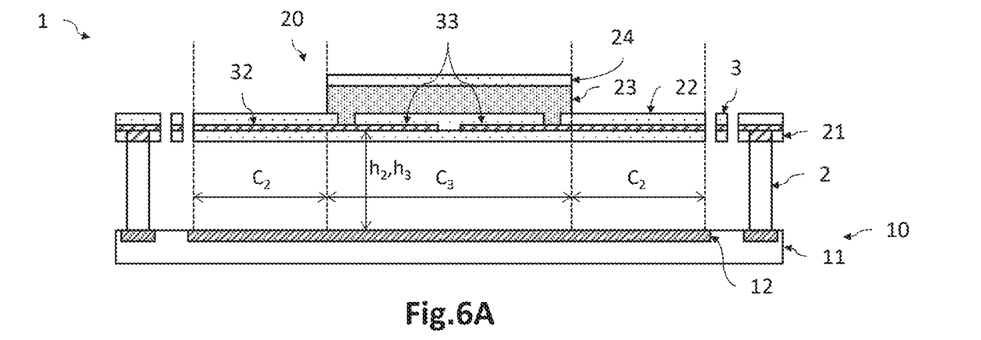
FIG. 6A is a partial schematic view, in cross-section, of a thermal detector according to one embodiment.
Figure 6B:
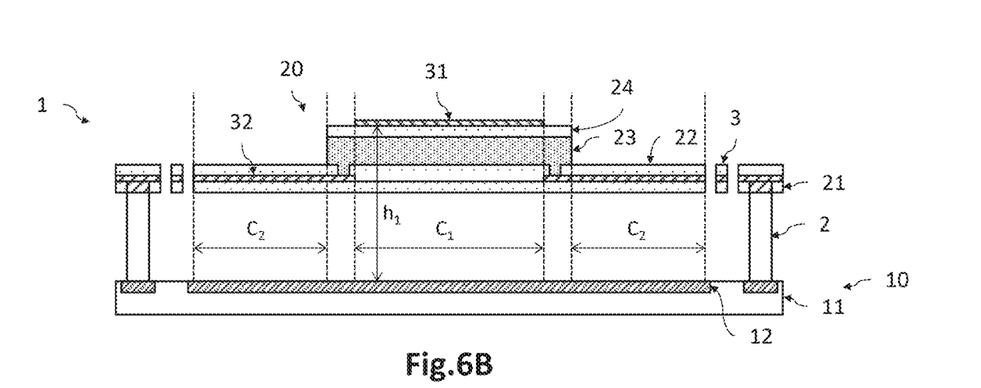
FIG. 6B is a partial schematic view, in another cross-section, of the thermal detector shown in FIG. 6A.
Figure 6C:
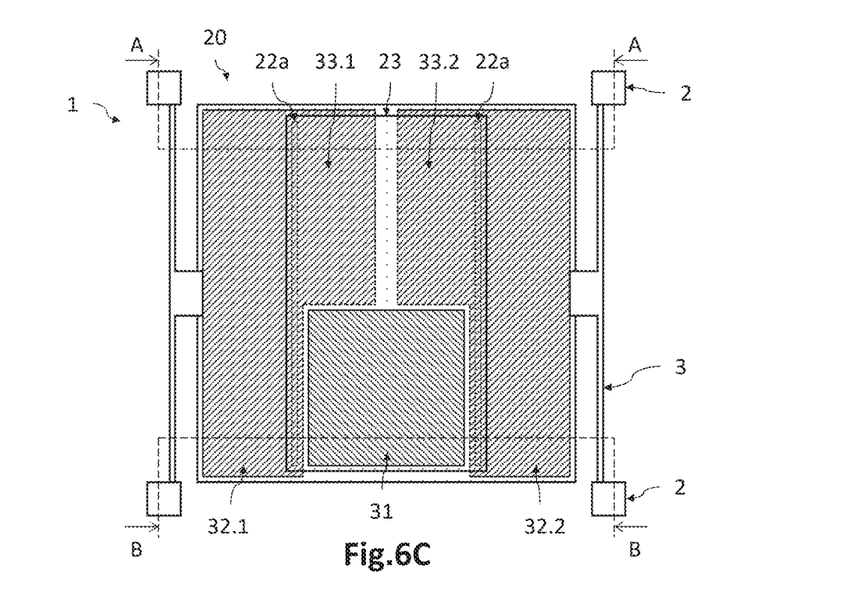
FIG. 6C is a top view of the thermal detector shown in FIG. 6A.

FIG. 6A and FIG. 6B are partial schematic views of a thermal detector 1 of electromagnetic radiation according to one embodiment, in cross-section respectively along the section lines AA and BB (cf. FIG. 6C). FIG. 6C is a top view of the thermal detector 1 shown in FIGS. 6A and 6B.

In this example, the absorbent membrane 20 has the same thermometer transducer 23 thermally coupled to more than two absorbers, in this case to three absorbers 31, 32, 33 forming three separate quarter-wave cavities $C_1$, $C_2$, $C_3$ in terms of absorption spectral band.

The absorbent membrane 20 has here a lower insulating layer 21, a thin metal film in two spatially distinct parts in the plane XY which form polarisation electrodes as well as the second and third absorbers 32, 33, an upper insulating layer 22, the thermometer transducer 23 (in this case a layer of thermistor material) which rests on the upper insulating layer and passes through it at openings 22a to come into contact with the metallic layer, an upper protective layer 24 which covers the thermometer transducer 23, and a thin metal film which rests on the thermometer transducer 23 and forms the first absorber 31 (upper absorber).

The upper absorber 31 is located on the thermometer transducer 23, at the distance $h_1$ from the reflector 12. The quarter-wave cavity $C_1$ makes it possible to optimise the absorption by the upper absorber 31 at the wavelength $\lambda_{c1}$ of the spectral band $\Delta\lambda_1$. Its medium includes in particular the upper protective layer 24, the thermistor material 23 and the two insulating layers 22, 21. As shown in FIG. 6C, the upper absorber 31 only extends over part of the surface of the thermometer transducer 23, in this case over around half of the surface thereof.

Furthermore, the metallic layer, formed by two parts which are polarisation electrodes, forms a second absorber 32 (quarter-wave cavity $C_2$) spaced by the distance $h_2$ from the reflector 12. In this quarter-wave cavity $C_2$, the second absorber 32 extends into the absorbent membrane 20 without being covered by the thermometer transducer 23. Absorption by this second absorber 32 takes place in a spectral sub-band $\Delta\lambda_2$, centred on the wavelength $\lambda_{c2}$. The medium associated with this quarter-wave cavity $C_2$ comprises here in particular the two insulating layers 21, 22.

In the third quarter-wave cavity $C_3$, the metallic layer extends over the absorbent membrane 20 and is covered by the thermometer transducer 23 (but not covered by the first absorber). More specifically, the two parts 33.1 and 33.2 of the metallic layer covered by the thermometer transducer 23 form the third absorber 33. This is spaced by the same distance $h_2$ from the reflector 12 as the second absorber 32. Absorption by this third absorber 33 takes place in a spectral sub-band $\Delta\lambda_3$, centred on the wavelength $\lambda_{c3}$. The medium associated with this quarter-wave cavity $C_3$ includes here in particular the upper protective layer 24, the thermistor transducer 23 and the two insulating layers 22, 21.

In this way, the three quarter-wave cavities $C_1$, $C_2$, $C_3$ are dimensioned, in terms of height $h_1$ and $h_2$ (in this case the distance $h_3$ of the third absorber is equal to $h_2$) and equivalent refractive index $n_{eq1}$, $n_{eq2}$ and $n_{eq3}$, to obtain a wide spectral band of detection $\Delta\lambda_{tot}$ while maintaining an absorption value $\alpha_{tot}$ uniformly above a reference value. In this way, the quarter-wave cavity $C_2$ can be designed to optimally absorb at the antiresonance of the quarter-wave cavity $C_1$. The quarter-wave cavity $C_3$ can be designed to absorb in a spectral band $\Delta\lambda_3$ comprised between $\Delta\lambda_1$ and $\Delta\lambda_2$, for example by adjusting the thickness of such or such layer of the absorbent membrane 20 located in the quarter-wave cavity $C_3$.

Figure 7A:
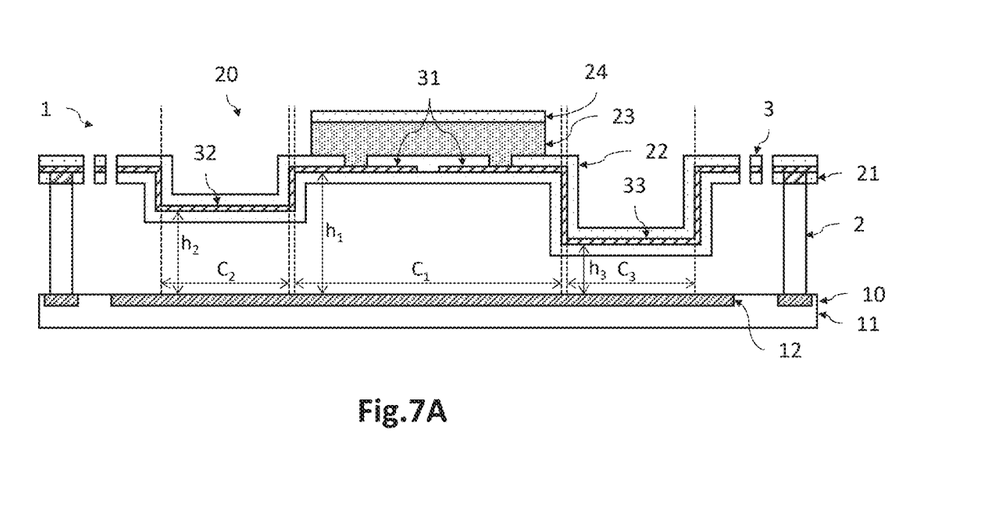
FIG. 7A is a partial schematic view, in cross-section, of the thermal detector according to one embodiment.
Figure 7B:
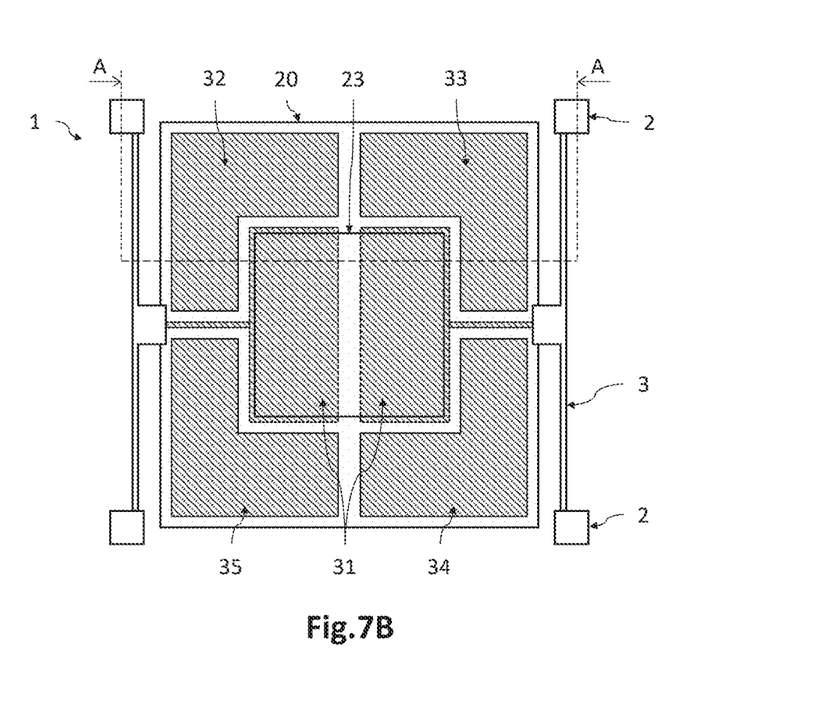
FIG. 7B is a top view of the thermal detector shown in FIG. 7A.

FIG. 7A is a partial schematic view, in cross-section, of a thermal detector 1 of electromagnetic radiation according to one embodiment, in cross-section along the section line $\Delta\lambda$(cf. FIG. 7B). FIG. 7B is a top view of the thermal detector 1 shown in FIG. 7A.

In this example, the absorbent membrane 20 has the same thermometer transducer 23 thermally coupled to more than two absorbers, in this case to five absorbers 31, 32, 33, 34 and 35 forming five separate quarter-wave cavities in terms of absorption spectral band.

The absorbent membrane 20 has here a lower insulating layer 21, a thin metal film in a plurality of spatially distinct parts in the plane XY which form polarisation electrodes and a plurality of different absorbers, an upper insulating layer 22, the thermometer transducer 23 (in this case a layer of thermistor material) which rests on the upper insulating layer and passes through it at openings 22a to come into contact with the metallic layer. An upper protective layer 24 covers the thermometer transducer 23.

The different parts of the thin metal film form the different absorbers 31 to 35 and define the quarter-wave cavities. In this example, there is no upper absorber which rests on the thermometer transducer 23, but alternatively, such an upper absorber can be present (in which case there would be no absorber covered by the thermometer transducer 23).

Two central parts form the first absorber 31, spaced by a distance $h_1$ from the reflector 12. They are covered by the thermometer transducer 23, and define the quarter-wave cavity $C_1$ with resonance wavelength $\lambda_{c1}$ in the spectral band $\Delta\lambda_1$. The medium with refractive index $n_{eq1}$ comprises in particular the thermometer transducer 23 and the two insulating layers 21, 22.

A side part forms another absorber 35, spaced by the same distance $h_1$ from the reflector 12. It is not covered by the thermometer transducer 23, and it defines the quarter-wave cavity $C_5$ with resonance wavelength $\lambda_{c5}$ in the spectral band $\Delta\lambda_5$. The medium with refractive index $n_{eq5}$ comprises in particular the two insulating layers 21, 22.

Three other side parts form different absorbers 32, 33, 34. They are spaced by the distance $h_2$, $h_3$ and $h_4$ from the reflector 12, different amongst themselves and from the value $h_1$. They are not covered by the thermometer transducer 23, and they define quarter-wave cavities $C_2$, $C_3$ and $C_4$, the resonance wavelengths of which are respectively $\lambda_{c2}$, $\lambda_{c3}$, and $\lambda_{c4}$. The media with refractive index $n_{eq2}$, $n_{eq3}$ and $n_{eq4}$ comprise essentially the two insulating layers.

In addition, the absorbent membrane has different levels where the absorbers 32, 33, 34 are located. They therefore have flat parts where the absorbers 32, 33, 34 are spaced from the reflector 12 by the respective distances $h_2$, $h_3$ and $h_4$, connected to the main flat part where the thermometer transducer 23 is located by vertical (as shown) or inclined connection parts. The flat parts where the absorbers 32, 33, 34 are located therefore form a step of the absorbent membrane 20 with respect to the main flat part.

In this way, the absorbent membrane 20 is designed, in terms of height $h_1$ to $h_5$ and equivalent refractive index $n_{eq1}$ to $n_{eq5}$, to obtain a wide spectral band of detection $\Delta\lambda_{tot}$ while maintaining an absorption value $\alpha_{tot}$ uniformly above a reference value. A plurality of quarter-wave cavities can be designed to optimally absorb at the antiresonance of other quarter-way cavities. Other quarter-wave cavities can also be designed to absorb in a spectral band comprised between those of other quarter-wave cavities.

Specific embodiments have just been described. Various variants and modifications will become apparent to a person skilled in the art.

The invention claimed is:

1. A thermal detector, configured to absorb electromagnetic radiation in a predefined spectral band, the detector comprising:
    a readout substrate, having: a readout circuit; and a reflector configured to reflect the electromagnetic radiation; and
    an absorbent membrane suspended above the readout substrate, thermally insulated from the readout substrate, having a thermometer transducer electrically connected to the readout circuit, and having:
        a first thin-film absorber, with a total surface area $S_1$, thermally coupled to the thermometer transducer, and configured to absorb the electromagnetic radiation in a spectral sub-band $\Delta\lambda_1$ of the spectral band, centered on a wavelength $\lambda_{c1}$, and is spaced from the reflector by a value $h_1$ equal to $\lambda_{c1}/4n_{eg1}$ so as to form therewith a first quarter-wave cavity $C_1$ for the wavelength $\lambda_{c1}$, $n_{eq1}$ being a refractive index of the medium associated with the first quarter-wave cavity $C_1$; and
        at least one second thin-film absorber, with a total surface area $S_2$, thermally coupled to said thermometer transducer, arranged in the absorbent membrane so as not to be covered by the first absorber, and the second absorber being configured to absorb the electromagnetic radiation in a spectral sub-band $\Delta\lambda_2$ of the spectral band, centered on a wavelength $\lambda_{c2}$, and being spaced from the reflector by a value $h_2$ equal to $\lambda_{c2}/4n_{eq2}$ so as to form therewith a second quarter-wave cavity $C_2$ for the wavelength $\alpha_{c2}$, $n_{eq2}$ being a refractive index of the medium associated with the second quarter-wave cavity $C_2$, the spectral sub-band $\Delta\lambda_2$ being centred on the wavelength $\lambda_{c2}$ equal to $\lambda_{c1}/2$ within plus or minus 2 μm,
    the first and second absorbers having total surface areas such that a surface area ratio $S_2/S_1$ is comprised between 0.5 and 3.

2. The thermal detector according to claim 1, wherein the first absorber rests on the thermometer transducer.

3. The thermal detector according to claim 1, wherein the second absorber extends into the absorbent membrane without being covered by the thermometer transducer.

4. The thermal detector according to claim 3, wherein the second absorber is formed by parts of a metallic layer, forming, on the one hand, polarization tracks at holding arms ensuring the support and thermal insulation of the absorbent membrane, and on the other hand, polarization electrodes coming into contact with the thermometer transducer.

5. The thermal detector according to claim 4, wherein the metallic layer extends in a planar manner into the holding arms and into the absorbent membrane.

6. The thermal detector according to claim 1, having a third absorber configured to absorb the electromagnetic radiation in a spectral sub-band $\Delta\lambda_3$ of the spectral band, centered on a wavelength $\lambda_{c3}$, and is spaced from the reflector by a value $h_3$ equal to $\alpha_{c3}/4n_{eq3}$ so as to form therewith a quarter-wave cavity $C_3$ for a wavelength $\lambda_{c3}$, $n_{eq3}$ being a refractive index of the medium associated with the quarter-wave cavity $C_3$, the wavelength $\lambda_{c3}$ being between the wavelengths $\lambda_{c1}$ and $\lambda_{c2}$.

7. The thermal detector according to claim 6, wherein the distance $h_3$ is equal to the distance $h_2$, the third absorber being covered by the thermometer transducer.

8. The thermal detector according to claim 1, having at least one absorber configured to absorb the electromagnetic radiation in a spectral sub-band $\Delta\lambda_4$ of the spectral band, centered on a wavelength $\lambda_{c4}$, and is spaced from the reflector by a value $h_4$ equal to $\lambda_{c4}/4n_{eq4}$ so as to form therewith a quarter-wave cavity $C_4$ for a wavelength $\lambda_{c4}$, $n_{eq4}$ being a refractive index of the medium associated with the quarter-wave cavity $C_4$, the absorber of the quarter-wave cavity $C_4$ being in a flat part of the absorbent membrane forming a step with respect to a main plane in which a metallic layer extends forming polarization tracks located in the holding arms and polarization electrodes in contact with the thermometer transducer.

9. The thermal detector according to claim 1, wherein the spectral band of detection comprises the spectral band LWIR ranging from 8 to 12 μm.

10. The thermal detector according to claim 1, having absorption at least equal to 80% across the entire spectral band of detection.

* * * * *